United States Patent [19]

Engstrom et al.

[11] Patent Number: 5,540,433
[45] Date of Patent: Jul. 30, 1996

[54] PILOT HOLE DRILL FOR GOLF TEE

[76] Inventors: J. Dennis Engstrom, 409 E. Main St., Youngsville, Pa. 16371; George Spector, 233 Broadway Room 702, New York, N.Y. 10279

[21] Appl. No.: 404,738

[22] Filed: Mar. 15, 1995

[51] Int. Cl.⁶ .............................. F16L 45/00; E21B 7/00; A01C 5/00
[52] U.S. Cl. ........................ 473/386; 175/19; 111/116; 111/99
[58] Field of Search ........................... 111/115, 116, 117, 111/89, 99; 175/19; 273/32.5, 32 R, 32 B

[56] References Cited

U.S. PATENT DOCUMENTS

| | | | |
|---|---|---|---|
| 182,989 | 10/1876 | Bernard et al. | 111/115 X |
| 1,856,065 | 5/1932 | Austin | 111/116 X |
| 3,415,518 | 12/1968 | Root | 111/99 X |
| 3,731,405 | 5/1973 | Kincaid | 273/32.5 X |
| 4,275,672 | 6/1981 | Clad | 111/99 |
| 4,905,999 | 3/1990 | Voinovich | 273/32.5 |
| 5,133,269 | 7/1992 | Charneski | 175/19 X |
| 5,353,883 | 10/1994 | Kattentidt | 175/19 |

*Primary Examiner*—George J. Marlo

[57] ABSTRACT

A golf tee drill comprising a cylindrical casing having a removable cap at a first end. A spring is mounted in the removable cap. An electric motor is provided, having a rotatable shaft. The motor is secured within a second end of the casing. A battery is within the casing between the spring and the motor. A switch is on the casing and is electrically connected between the motor and the battery. An auger drill bit is also provided, having a cone shaped collar. A coupling assembly is for attaching the auger drill bit at the cone shaped collar to the shaft of the motor. When the switch is turned on, the auger drill bit will rotate to penetrate hard ground and form a pilot hole for setting a golf tee therein.

4 Claims, 1 Drawing Sheet

PILOT HOLE DRILL FOR GOLF TEE

BACKGROUND OF THE INVENTION

The instant invention relates generally to golf accessories and more specifically it relates to a golf tee drill, which provides a drill bit to penetrate hard ground and form a pilot hole for setting a golf tee therein.

There are available various conventional golf accessories which do not provide the novel improvements of the invention herein disclosed.

SUMMARY OF THE INVENTION

A primary object of the present invention is to provide a golf tee drill that will overcome the shortcomings of the prior art devices.

Another object is to provide a golf tee drill, in which a battery operated motor driven drill bit will penetrate hard ground and form a pilot hole for setting a golf tee therein.

An additional object is to provide a golf tee drill that is housed in a pen shaped configuration to conveniently fit in a pocket attached to a golf cart, or hang from a golf bag, so that it will always be accessible for use by a golfer.

A further object is to provide a golf tee drill that is simple and easy to use.

A still further object is to provide a golf tee drill that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 2:
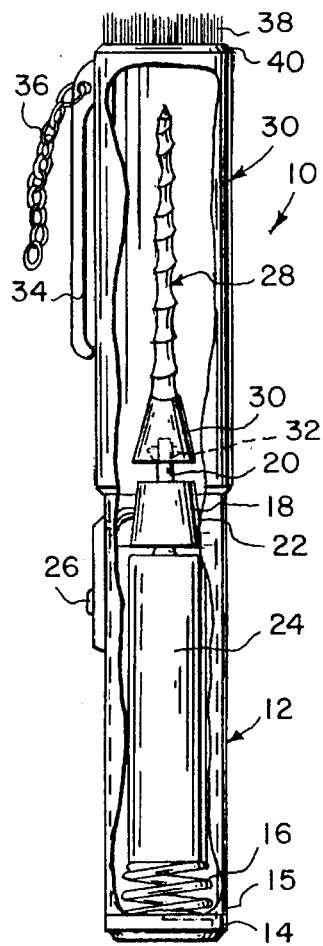
FIG. 2 is an elevational view taken in the direction of arrow 2 in FIG. 1, with parts broken away to see the internal components.
Figure 1:
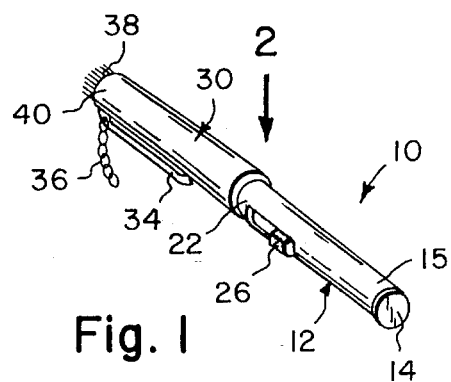
FIG. 1 is a perspective view of the first embodiment of the instant invention.

Turning now descriptively to the drawings, in which similar reference characters denote similar elements throughout the several views, FIGS. 1 through 5 illustrate a golf tee drill 10 comprising a cylindrical casing 12 having a removable cap 14 at a first end 15. A spring 16 is mounted in the removable cap 14. An electric motor 18 is provided having a rotatable shaft 20. The motor 18 is secured within a second end 22 of the casing 12. A battery 24 is within the casing 12 between the spring 16 and the motor 18. A switch 26 is on the casing 12 and is electrically connected between the motor 18 and the battery 24. An auger drill bit 28 is also provided, having a cone shaped collar 30. A coupling assembly 32 is for attaching the auger drill bit 28 at the cone shaped collar 30 to the shaft 20 of the motor 18. When the switch 26 is turned on, the auger drill bit 28 will rotate to penetrate hard ground and form a pilot hole for setting a golf tee therein.

A cylindrical cover 32 fits onto the second end 22 of the casing 12 and over the auger drill bit 28. A clip 34 is on the cover, so that the drill 10 can be removably secured onto a person and an object. A chain 36 is attached to the clip 34, so that the drill 10 can be suspended therefrom. A brush head 38 is affixed onto a distal end 40 of the cover 30, to wipe soil off of the auger drill bit 28.

Figure 3:
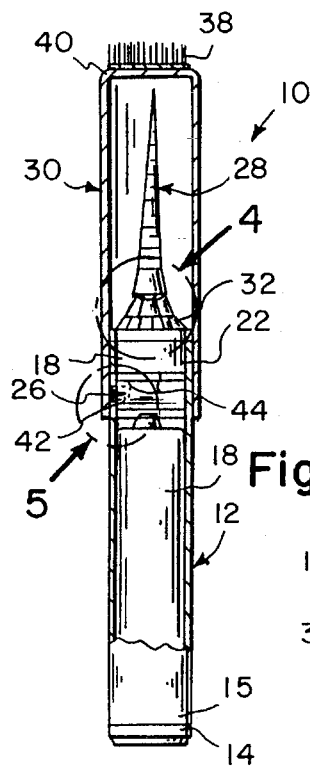
FIG. 3 is an elevational view similar to FIG. 2 of a second embodiment of the instant invention.
Figure 4:
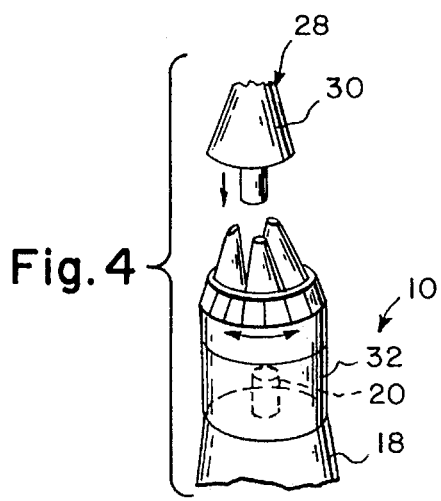
FIG. 4 is an enlarged partly exploded perspective view as indicated by arrow 4 in FIG. 3, showing the bit coupling assembly in greater detail.
Figure 5:
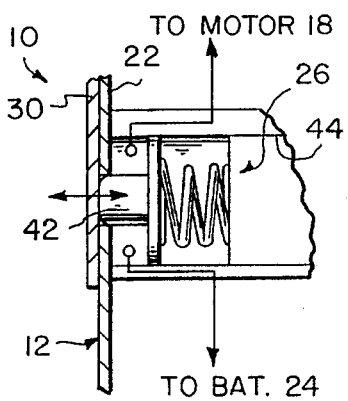
FIG. 5 is an enlarged cross sectional view as indicated by arrow 5 in FIG. 3, showing a button switch which is turned on by the removal of the cover from the casing.

The switch 26, shown in FIGS. 3 and 5, is a button switch 42 mounted in a recess 44 near the second end 22 of the casing 12 and is turned on by the removal of the cover 30 from the casing 12.

The casing 12 can be made of metal or plastic and can come in various colors. To be more practical, the auger drill bit 28 can be permanently connected onto the shaft 20 of the motor 18. If the auger drill bit 28 become dull or broken, the drill 10 can be discarded and replaced by a new drill 10.

OPERATION OF THE INVENTION

To use the golf tee drill 10, a person simply removes the cover 30 form the casing 12. The switch 26 is then turned on. This will activate the motor 18 to rotate the auger drill bit 28. The auger drill bit 28 can now penetrate the hard ground and form the pilot hole for the setting of the golf tee. If the drill 10 contains the button switch 42, the button switch 42 will be automatically turned on when the cover 30 is removed from the casing 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A golf tee drill comprising:

a) a cylindrical casing having a removable cap at a first end;

b) a spring mounted in said removable cap;

c) an electric motor having a rotatable shaft, said motor secured within a second end of said casing;

d) a battery within said casing between said spring and said motor;

e) a switch on said casing and electrically connected between said motor and said battery;

f) an auger drill bit having a cone shaped collar; and g) a coupling assembly for attaching said auger drill bit at said cone shaped collar to said shaft of said motor, so that when said switch is turned on said auger drill bit will rotate to penetrate hard ground and form a pilot hole for setting a golf tee therein.

2. A golf tee drill as recited in claim 1, further including:

a) a cylindrical cover to fit onto the second end of said casing and over said auger drill bit; and b) a clip on said cover, so that said drill can be removably secured onto a person and an object.

3. A golf tee drill as recited in claim 2, further including:

a) a chain attached to said clip, so that said drill can be suspended therefrom; and b) a brush head affixed onto a distal end of said cover, to wipe soil off of said auger drill bit.

4. A golf tee drill as recited in claim 3, wherein said switch is a button switch mounted in a recess near the second end of said casing and is turned on by the removal of said cover from said casing.

* * * * *